United States Patent [19]

LeAnna

[11] Patent Number: 5,226,622
[45] Date of Patent: Jul. 13, 1993

[54] FULLY ADJUSTABLE PORTABLE TRAP STAND

[75] Inventor: Dave LeAnna, Monteagle, Tenn.

[73] Assignee: Next Generation, Inc., Monteagle, Tenn.

[21] Appl. No.: 883,433

[22] Filed: May 15, 1992

[51] Int. Cl.[5] ............................................. F16M 11/12
[52] U.S. Cl. ....................................... 248/183; 124/8; 248/219.2; 248/278
[58] Field of Search ...................... 248/183, 219.2, 278, 248/122, 279; 124/8

[56] References Cited

U.S. PATENT DOCUMENTS

| | | | |
|---|---|---|---|
| 252,230 | 1/1882 | Ligowsky | 248/183 X |
| 313,804 | 3/1885 | Bloom | 248/183 X |
| 328,051 | 10/1885 | Mueller | 248/183 X |
| 434,077 | 8/1890 | Brett | 248/183 X |
| 455,310 | 7/1891 | Damm | 248/183 X |
| 519,512 | 5/1894 | Tichenor | 248/183 X |
| 679,289 | 7/1901 | Bowron | 248/183 X |
| 2,455,661 | 12/1948 | DuPont | 124/8 |
| 2,925,077 | 2/1960 | Luebkeman | 124/8 |

FOREIGN PATENT DOCUMENTS

| | | | |
|---|---|---|---|
| 456285 | 5/1949 | Canada | 248/183 |
| 454470 | 1/1928 | Fed. Rep. of Germany | 248/183 |

OTHER PUBLICATIONS

Two Trius Products, Inc. brochures.
Outers brochure.
Winchester Traps by LaPorte brochure.
Ibis Target Products Pty, Ltd. brochure.
Quack Sporting Clays, Inc. brochure.

Primary Examiner—J. Franklin Foss
Attorney, Agent, or Firm—Miller & Martin

[57] ABSTRACT

The invention is an adjustable portable trap stand which can be easily anchored, allows the mounting of a trap to the stand, and provides for easy adjustment and locking so that the trap can be securely oriented in the desired direction. Briefly, the adjustable portable trap stand comprises a mounting plate to which a trap can be attached, a base which allows the trap stand to be securely anchored, adjusting means which permit the mounting plate to be oriented through a wide range of directions with respect to the base, and locking means that substantially fixes the orientation of the mounting plate in spite of recoil forces applied to it by operation of an attached trap.

10 Claims, 2 Drawing Sheets

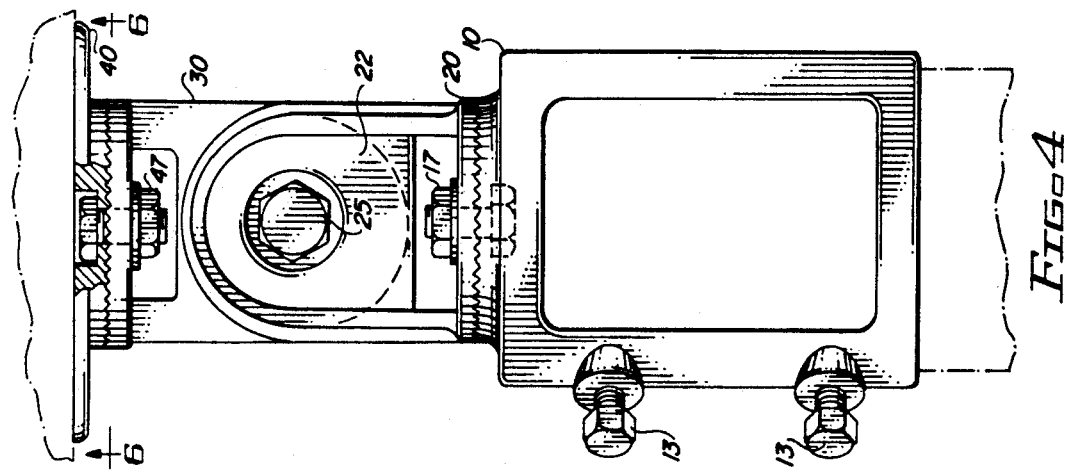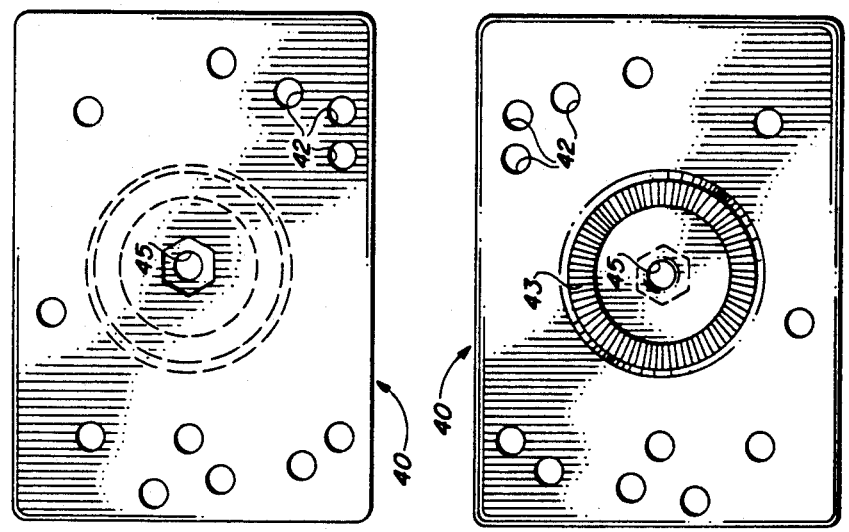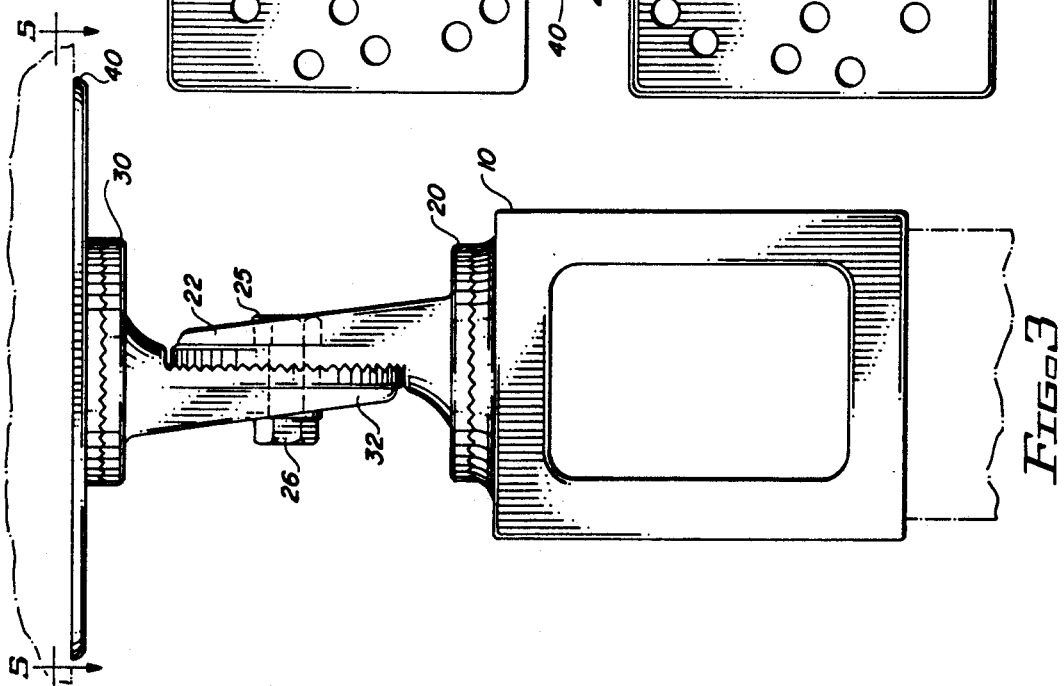

FULLY ADJUSTABLE PORTABLE TRAP STAND

BACKGROUND OF THE INVENTION

The present invention relates to trap stands and more particularly to portable and adjustable trap stands.

In the sport of trapshooting, disks known as "clay pigeons" are designed to be projected through the air with the speed and flight trajectory comparable to that of a game bird and to fragment easily when struck by one or more pellets from a shooter's shotgun. The clay pigeons are projected or scaled through the air at speeds approaching sixty miles an hour by a mechanical device called a trap.

At gun clubs, expensive fully automatic magazine loaded traps (holding several hundred clay pigeons at each loading) are mounted in small sheds called trap houses. In regulation trap, shooters stand behind the trap house and when a shooter asks for a target, the trap throws a clay pigeon into the air at varying angles generally within an arc of 44° opposite the shooting position. Skeet is a refinement of trap shooting which provides for clay pigeons being thrown from a high house (a trap house with the trap installed about ten feet above the ground) and a low house (where the trap is installed about two or three feet above the ground).

Another version of clay pigeon shooting is frequently referred to as a "quail walk" where traps are positioned along a path in a field. Clay pigeons are thrown by the traps as a shooter progresses along the path. Quail walks have the advantage of providing the shooter with a greater variety of shots and an element of surprise that is not available in the more restrictive formats of trap and skeet shooting. Because of the number of different traps required for a quail walk, and the inability to maintain any significant surprise when traps are mounted in trap houses, expensive fully automatic magazine loaded traps are generally not suitable for this version of shooting. Accordingly, less expensive traps adjustable to throw a wide variety of trajectories are desirable for quail walks. In addition, individuals desiring to practice clay pigeon shooting in their own fields or less formal settings frequently purchase inexpensive traps such as those made by Trius Products, Inc. or even hand traps by which one person propels the clay pigeons into the air for the shooter. The portable trap is preferable to the hand trap both because of the uniformity of its throw, and because it does not require the presence of an additional person in order for the shooter to practice. In both quail walks and other informal shooting it is desirable that the trap mounts provide for a wide variety of adjustments so that targets may be thrown along many diverse trajectories. It is also desirable that the trap mounts be easily and securely anchored so that a firm base is provided for the trap.

However, the art of mounting inexpensive and portable traps remains unsatisfactory as the current trap stands are expensive, require the presence of an additional person other than the shooter, or provide only limited or difficult adjustments to vary the throw of the clay pigeons.

OBJECTS OF THE INVENTION

It is an object of the invention to provide a fully adjustable trap stand that will allow the mounting of a portable trap and provide for adjustments so that the mounted trap can not only throw targets suitable for regulation trap and skeet shooting, but also throw targets in a nearly vertical trajectory to simulate a rising teal and throw targets along the ground to simulate a running rabbit.

It is a further object of the invention to provide a trap stand that is fully portable.

It is yet another object of the invention to provide a trap stand that can be easily mounted or anchored to posts, decking, or other structures.

It is yet a further object of the invention that the fully adjustable portable trap stand apparatus be easily and inexpensively made.

SUMMARY OF THE INVENTION

The foregoing objects are achieved by the present invention, which is a fully adjustable portable trap stand. It has been developed to allow for ease of set-up and adjustment and for economical manufacture. The fully adjustable portable trap stand comprises a mounting plate upon which traps can be secured, a base which allows the trap and stand to be securely anchored, and an adjusting means which allows the trap to be positioned to throw the widest variety of clay pigeon trajectories possible. This adjusting means preferably consists of two connections allowing for 360° rotation disposed about a joint allowing of at least 180° of arcuate movement. However, lesser degrees of rotation and arcuate movement may still produce a satisfactory trap stand.

DESCRIPTION OF THE DRAWINGS

The invention will be described with reference to the accompanying drawings where:

FIG. 3 is a side plan view of the invention;

FIG. 4 is a front plan view of the invention;

FIG. 5 is a top plan view of the mounting plate of the invention; and

FIG. 6 is a bottom plan view of the mounting plate of the invention.

DETAILED DESCRIPTION

Figure 1:
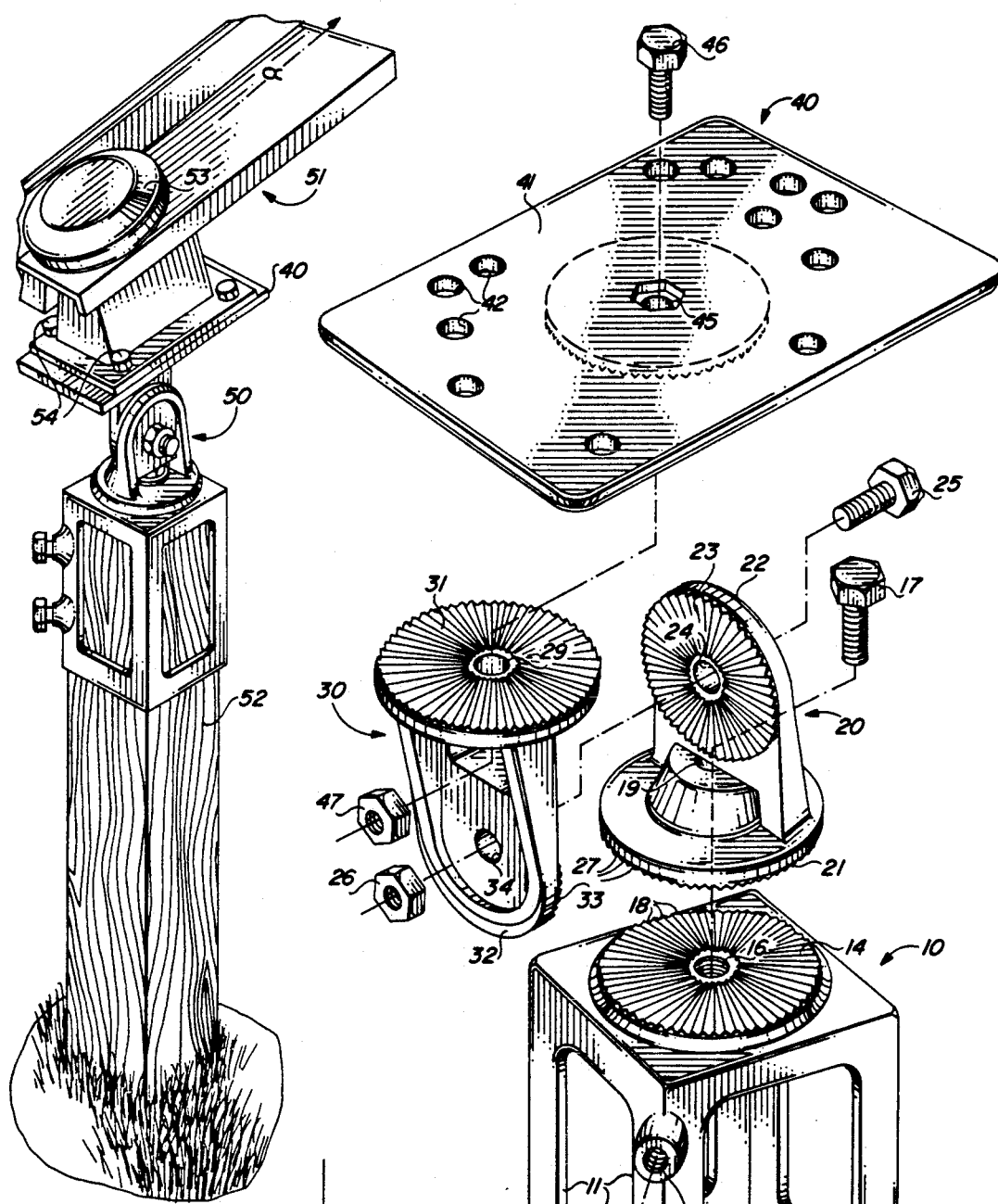
FIG. 1 is a perspective view of the invention in use, wherein the invention is shown anchored to the top of a post and an inexpensive trap is mounted on the invention.

Turning now to the drawings in more detail:

FIG. 1 depicts the adjustable trap stand 50 as it appears in use, where the adjustable trap stand 50 is anchored to a post 52 and an inexpensive trap 51 is mounted to the mounting plate 40 (shown in more detail in FIGS. 2–6) of the adjustable trap stand. When the trap is released, it will throw the clay pigeon 53 substantially in the direction of the orientation of the trap 51 indicated by the line $\alpha$, thereby providing a target for one or more shooters.

Figure 2:
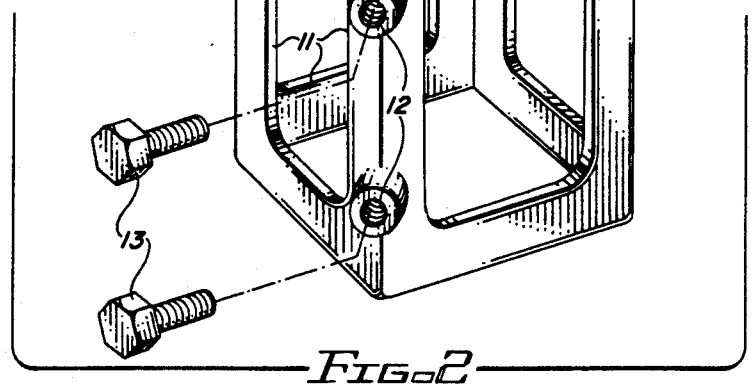
FIG. 2 is an exploded perspective view of the invention.

Turning now to FIG. 2 which discloses a preferred embodiment of the invention in greater detail, the invention comprises a base 10, a lower rotating member 20, an upper rotating member 30, and a mounting plate 40. The base 10 provides a means for anchoring the invention to a deck or post and among other alternative constructions may be comprised of a plate with apertures for receiving bolts, or a clamping means as shown in the illustrated embodiment which comprises, an engaging frame 11 designed to fit upon the top end of post 52 (shown in FIG. 1), with threaded apertures 12 for receiving bolts 13 which will thereby securely engage a post within the engaging frame 11. The illustrated embodiment of the base further comprises a bearing surface 14 and threaded aperture 16. The lower rotating member 20 comprises a lower bearing surface 21 and an adjusting and fastening means such as the bolt 17, received through aperture 19 and when tightly fastened in the threaded aperture 16 of the base 10 secures the lower rotating member 20 in a substantially fixed position relative to the base 10 so that the direction of the clay pigeons 53 thrown by the trap 51 will be reasonably predictable. To prevent undesirable movement between the lower rotating member 20 and the base 10, a locking means is employed such as the illustrated channelling of bearing surfaces 21 and 14 so that the raised ribs 27 on surface 21 act as detents by engaging in valleys 18 on surface 14, thereby fixing the lower rotating member 20 relative to the base 10. When unfastened, said adjusting and fastening means permits easy adjustment to vary the direction of the lower rotating member 20 and as a result, the direction of the trap 51 and the trap's throw $\alpha$. The illustrated embodiment shows the channelled lower bearing surface 21 with aperture 19 resting upon the channelled bearing surface 14 of the base 10, and fastened thereto by a bolt 17 engaging the threaded aperture 16. When the bolt 17 is loosened, the lower rotating member 20 may be adjusted rotationally to orient itself and the attached upper rotating member 30 and mounting plate 40 in the desired direction. In the illustrated embodiment, the lower rotating member 20 may be rotated through a full 360° of circumference although other embodiments allowing as little as 45° of adjustment may be utilized effectively.

The lower rotating member 20 is pivotably fastened to the upper rotating member 30 so that the plane of the mounting plate 40 attached to the upper rotating member 30 may be variably adjusted from a horizontal to a nearly vertical position. In the preferred embodiment, the lower rotating member 20 further comprises a shoulder 22 with a bearing surface 23 having an aperture 24. The upper rotating member 30 is substantially identical to the lower rotating member 20 but is attached thereto in inverted position. Particularly, the upper rotating member comprises a shoulder 32 with a bearing surface 33 having an aperture 34.

The lower rotating member 20 is attached to the upper rotating member 30 by adjusting and fastening means such as the bolt 25 passing through the apertures, 34 and 24, into a nut 26. Said adjusting and fastening means cause the channelled shoulder bearing surface 33 of the upper rotating member 30 to be tightly clamped to the channelled shoulder bearing surface 23 of the lower rotating member 20. When the ribs and valleys on channelled shoulder bearing surfaces 23 and 33 engage, very little movement is permitted between members 20, 30. When the bolt 25 is loosened, the upper rotating member 30 may be pivoted in the desired direction with respect to the lower rotating member 20. In the illustrated embodiment, the upper rotating member 30 may be pivotally adjusted with respect to the lower rotating member 20 through over 180° of arcuate movement. Other embodiments allowing as little as 60° of adjustment may also be utilized effectively.

The upper rotating member 30 is also rotatably fastened to the mounting plate 40. FIG. 2 shows the upper rotating member 30 with an upper bearing surface 31 having an aperture 29 and resting thereon is the mounting plate 40 with a bearing surface 43 (shown in FIG. 6) having an aperture 45. The adjusting and fastening means comprises a bolt 46 passing through the threaded aperture 45 into the like aperture 29 of the upper rotating member 30 and secured by the nut 47. (Shown in FIG. 4). When the nut 47 is loosened, the mounting plate may be adjusted rotationally in the desired direction with respect to the upper rotatable member 30. In the illustrated embodiment, the mounting plate 40 may be rotationally adjusted through a full 360° of circumference with respect to the upper rotating member 30. Other embodiments allowing as little as 60° of adjustment may also be utilized effectively. It will also be understood that a locking means such as the previously described channelling of the bearing surfaces (here surfaces 31 and 43), may be utilized so that the mounting plate and upper rotating member can be held in a substantially fixed position when the adjusting and fastening means is in the fastened position.

FIGS. 3 and 4 provide side and front plan views of the invention, as assembled.

FIGS. 5 and 6 illustrate the mounting plate 40 in top and bottom plan views, respectively. Said mounting plate 40 further comprises a mounting surface 41 upon which a trap 51 (shown in FIG. 1) may be placed, and having apertures 42 to receive bolts 54 (shown in FIG. 1) to securely mount the trap 51 to the mounting plate 40.

Alternative ways of constructing the rotatable and pivotable connections, locking means, and adjusting and fastening means will undoubtedly occur to those skilled in the art. The description contained herein is merely illustrative and is not intended to limit the scope of the claimed invention.

Accordingly, in application, the adjustable trap stand 50 is first anchored to a deck, post 52 or other suitable object. A trap 51 is then mounted upon the mounting plate 40. The bolt 17 securing the lower rotating member 20 to the base 10 is loosened and the lower rotating member 20 is rotatably positioned in the desired direction, and the bolt 17 is refastened. Then the bolt 25 securing the shoulder bearing surfaces 23, 33 of the lower rotating member 20 and upper rotating member 30 is loosened and the upper rotating member is pivotally adjusted with respect to the lower rotating member 20 before the bolt 25 is refastened. Then the nut 47 is loosened and the mounting plate 40 is rotatably positioned in the desired direction with respect to the upper rotating member 30, and the nut 47 is refastened. When operated, the trap 51 will then throw clay pigeons in the trajectory and direction $\alpha$ for which it has been positioned.

It is to be understood that the preferred embodiment of the invention and the best mode for practicing the invention presently contemplated have been shown and described, but that minor changes and modifications may well be made by those skilled in the art without any departure from the scope of the invention defined in the following claims.

What is claimed is:

1. An adjustable trap stand comprising:
   (a) A base member with anchoring means;
   (b) A lower rotating member rotatably connected to said base member by adjusting and fastening means;
   (c) An upper rotating member pivotably connected to said lower rotating member by adjusting and fastening means;

(d) A trap mounting member rotatably connected to said upper rotating member by adjusting and fastening means.

2. The adjustable trap stand recited in claim 1 wherein said anchoring means comprises a clamping means.

3. The adjustable trap stand recited in claim 1 wherein the adjusting and fastening means connecting said base member and said lower rotating member permits at least 45° of rotational movement by said lower rotating member with respect to said base member.

4. The adjustable trap stand recited in claim 1 wherein the adjusting and fastening means connecting said lower rotating member and said upper rotating member permits said upper rotating member to pivot through an arc of at least 60° with respect to said lower rotating member.

5. The adjustable trap stand recited in claim 1 wherein the adjusting and fastening means connecting said upper rotating member and said trap mounting member permits at least 60° of rotational movement by said trap mounting member with respect to said base member.

6. The adjustable trap stand recited in claim 1 further comprising a locking means between the base member and the lower rotating member.

7. The adjustable trap stand recited in claim 1 further comprising a locking means between the lower rotating member and the upper rotating member.

8. The adjustable trap stand recited in claim 1 further comprising a locking means between the upper rotating member and the trap mounting member.

9. The adjustable trap stand recited in claim 1 wherein the trap mounting member further comprises apertures through which bolts may be received to mount a trap to said trap mounting member.

10. The adjustable trap stand comprising:
(a) A base member with anchoring means;
(b) A lower rotating member rotatably connected to said base member by locking means and by adjusting and fastening means which permit 360° of rotational movement by said lower rotating member with respect to said base member;
(c) An upper rotating member pivotably connected to said lower rotating member by locking means and by adjusting and fastening means that permit said upper rotating member to pivot through an arc of at least 180° with respect to said lower rotating member;
(d) A trap mounting member rotatably connected to said upper rotating member by locking means and by adjusting and fastening means which permit 360° of rotational movement by said trap mounting member with respect to said upper rotating member.

* * * * *